US009375747B2

(12) United States Patent
Neuhaus et al.

(10) Patent No.: US 9,375,747 B2
(45) Date of Patent: Jun. 28, 2016

(54) VALVE, IN PARTICULAR GLUE VALVE

(71) Applicant: Focke & Co. (GmbH & Co. KG), Verden (DE)

(72) Inventors: Nils Neuhaus, Buxtenhude (DE); Marc-Daniel Stegen, Hamburg (DE); Reinhard Hoppe, Tespe (DE)

(73) Assignee: Focke & Co. (GmbH & Co. KG), Verden (DE)

( * ) Notice: Subject to any disclaimer, the term of this patent is extended or adjusted under 35 U.S.C. 154(b) by 31 days.

(21) Appl. No.: 14/355,896

(22) PCT Filed: Nov. 2, 2012

(86) PCT No.: PCT/EP2012/004567
§ 371 (c)(1),
(2) Date: May 2, 2014

(87) PCT Pub. No.: WO2013/068084
PCT Pub. Date: May 16, 2013

(65) Prior Publication Data
US 2015/0053876 A1    Feb. 26, 2015

(30) Foreign Application Priority Data
Nov. 8, 2011    (DE) .......................... 10 2011 117 836

(51) Int. Cl.
*F16K 31/06*    (2006.01)
*B05C 5/02*    (2006.01)
(Continued)

(52) U.S. Cl.
CPC ........... *B05C 5/0225* (2013.01); *F16K 31/0658* (2013.01); *F16K 31/0662* (2013.01); *F16K 31/0675* (2013.01); *H01F 5/02* (2013.01); *H01F 7/1607* (2013.01); *Y10T 137/0318* (2015.04)

(58) Field of Classification Search
CPC . F16K 31/06; F16K 31/0675; F16K 31/0658; F16K 31/0662; Y10T 137/0318; B05C 5/0225; B05C 11/1002
USPC ....................................................... 251/129.04
See application file for complete search history.

(56) References Cited

U.S. PATENT DOCUMENTS 4,922,852 A * 5/1990 Price ....................... B05B 12/08
                                                    118/323
4,988,015 A * 1/1991 Price ................... B05B 13/0431
                                                    118/684
(Continued)

FOREIGN PATENT DOCUMENTS

DE            4447016 A1    7/1996
DE     202008004350 U1    8/2009
(Continued)

OTHER PUBLICATIONS

Deutsches Patent—Und Markenamt, Recherchebericht (German Patent Office Search Report on related patent application (Jan. 12, 2012).
(Continued)

*Primary Examiner* — Matthew W Jellett
(74) *Attorney, Agent, or Firm* — Laurence P. Colton; Smith Tempel Blaha LLC

(57) ABSTRACT

The valve, in particular glue valve, consists of a valve housing (10) and of a plug unit (11) fitted thereto. The two parts are assembled separately, with connecting clips (41, 42) being connected to the plug unit (11) and, when the plug unit (11) is fitted onto the valve housing (10), being connected to the latter, namely to the coil core (15), via clamping members.

6 Claims, 4 Drawing Sheets

(51) Int. Cl.
*H01F 5/02* (2006.01)
*H01F 7/16* (2006.01)

(56) References Cited

U.S. PATENT DOCUMENTS

| | | | | |
|---|---|---|---|---|
| 5,054,650 | A * | 10/1991 | Price | B05B 12/08 |
| | | | | 118/688 |
| 5,056,034 | A * | 10/1991 | Rucki | B29B 7/72 |
| | | | | 261/DIG. 26 |
| 5,673,820 | A * | 10/1997 | Green | B67D 1/0036 |
| | | | | 220/510 |
| 6,318,599 | B2 * | 11/2001 | Estelle | B05C 5/001 |
| | | | | 222/146.5 |
| 6,380,861 | B2 * | 4/2002 | Estelle | B05C 5/001 |
| | | | | 222/146.5 |
| 7,175,420 | B2 * | 2/2007 | Babin | B29C 45/2703 |
| | | | | 425/564 |
| 8,991,784 | B2 * | 3/2015 | Jurgens | B05C 5/0225 |
| | | | | 137/315.03 |
| 9,126,223 | B2 * | 9/2015 | Lanier | B05B 15/0233 |
| 2003/0161939 | A1 | 8/2003 | Kweon | |
| 2003/0205588 | A1 | 11/2003 | Lee | |
| 2004/0081759 | A1 | 4/2004 | Maruyama | |
| 2004/0195278 | A1 | 10/2004 | Leeuw | |

FOREIGN PATENT DOCUMENTS

| | | |
|---|---|---|
| EP | 1128400 A2 | 8/2001 |
| WO | 2010136096 A1 | 12/2010 |

OTHER PUBLICATIONS

WIPO/PCT, International Search Report (on priority application) (Feb. 20, 2013).

* cited by examiner

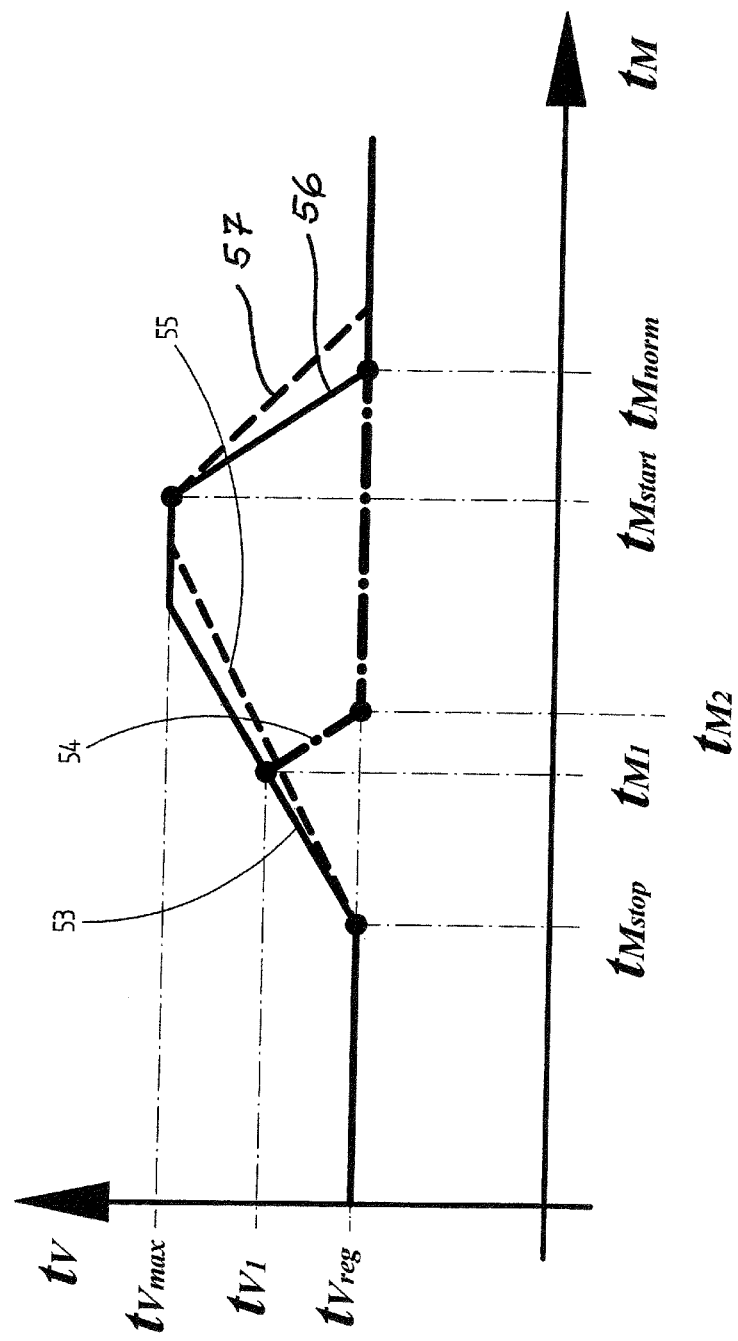

US 9,375,747 B2

VALVE, IN PARTICULAR GLUE VALVE

STATEMENT OF RELATED APPLICATIONS

This patent application claims the benefit of International Patent Application No. PCT/EP2012/004567 having an International Filing Date of 2 Nov. 2012, which claims the benefit of German Patent Application No. 10 2011 117 836.1 having a filing date of 8 Nov. 2011.

BACKGROUND OF THE INVENTION

1. Technical Field

The invention relates to a method for controlling a valve for free-flowing media, in particular a glue valve (glue nozzle) with an electromagnetically actuable closure member—valve tappet—having a closure piece which, in the closed position, bears against a valve seat.

2. Prior Art

A glue valve is illustrated and described in WO 2010/136096 A1. A closure member, namely a valve tappet, is surrounded by an (electric) coil with a coil core. The unit consisting of coil and coil core is accommodated in a valve housing with a laterally fitted plug unit. Furthermore, a glue connection with a glue duct and a plug for supplying power are respectively arranged on the valve housing and on the plug unit. The coil core is composed (in the practical implementation) of high-value plastic with fiber reinforcement.

BRIEF SUMMARY OF THE INVENTION

The present invention is concerned with structural and functional improvements of such (or similar) valves.

This object is achieved by a method for controlling the manner of operation of the valve, such as a method for actuating a valve for free-flowing media, in particular a glue valve with an electromagnetically actuable closure member—valve tappet—having a closure piece which, in the closed position, bears against a valve seat, characterized in that the period of the opening position of the valve—position of the valve tappet of the closure piece raised from the valve seat—is controllable, namely changeable, depending on the changeable viscosity of the medium, in particular the glue, in such a manner that, owing to different opening periods, substantially identically sized portions of the medium are dispensed during the opening period irrespective of the viscosity of the medium. The method involves taking into consideration changed physical parameters which have an effect on the viscosity of the medium (glue). This takes place according to the invention via the control of the opening period of the valve, with the result that, owing to the different opening time of the valve, substantially identically sized glue portions are dispensed or glue points or glue strips are produced at different viscosity. In particular, the opening duration is determined in accordance with a preceding stoppage phase of the valve and cooling associated therewith, and is taken into consideration during the re-start of the device by means of a longer opening period of the valve.

BRIEF DESCRIPTION OF THE DRAWINGS

Further features and details of the innovation are explained in more detail below with reference to the drawings, in which:

FIG. 5 shows a diagram relating to the control of (glue) valves.

DETAILED DESCRIPTION OF PREFERRED EMBODIMENTS

Figure 1:
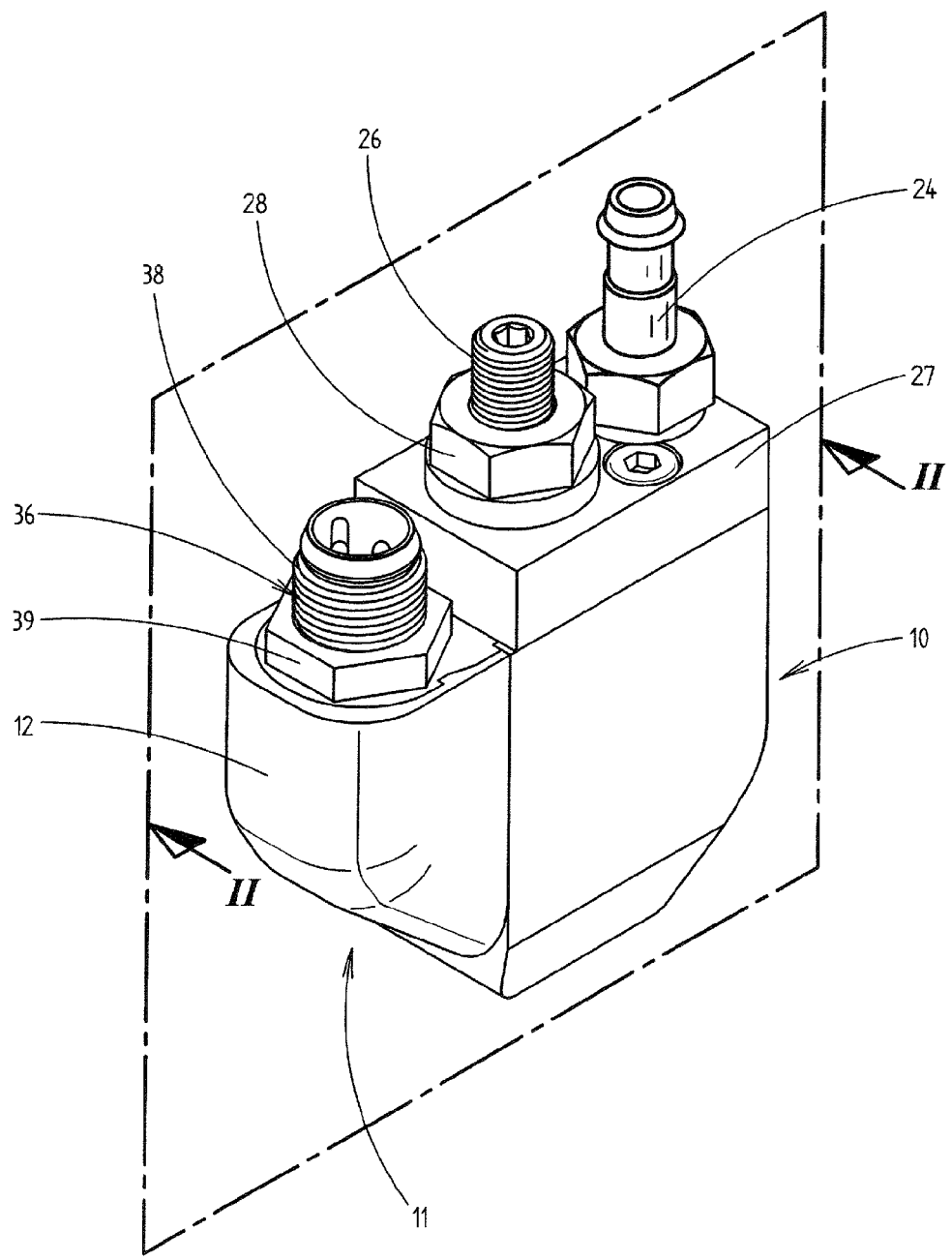
FIG. 1 shows a (glue) valve in a perspective external view.
Figure 2:
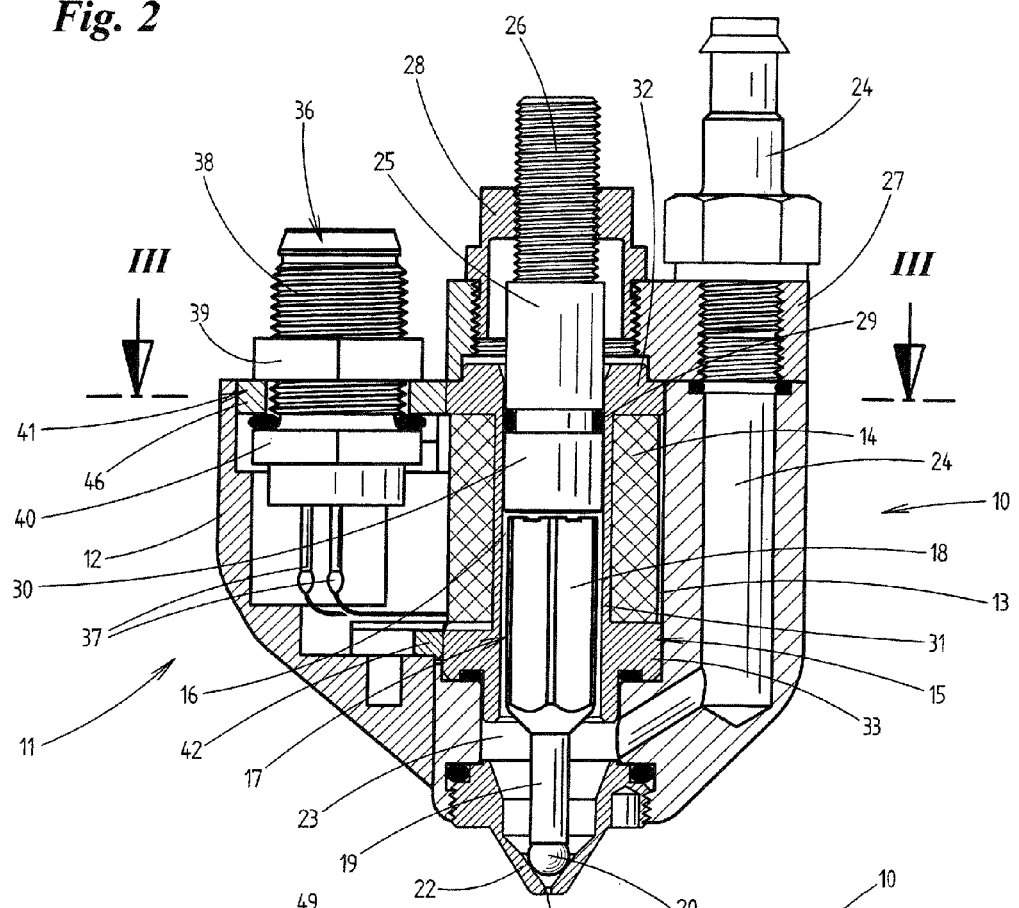
FIG. 2 shows the valve according to FIG. 1 in a vertical section corresponding to section plane II-II in FIG. 1.

The valve illustrated in the drawings is intended for the most important area of use, namely as a glue valve. It involves transferring relatively small portions of glue onto packaging material, in particular onto folding flaps of (cigarette) packs. The glue valve is intended for high cycle times.

The valve or glue valve illustrated as an exemplary embodiment in the drawings corresponds in basic design to the glue valve according to WO 2010/136096. A basic body accordingly consists of a valve housing 10, preferably of metal and a plug unit 11 which is fitted onto said valve housing as an addition thereto and has a plug housing 12 which complements the valve housing 10 and is preferably made of plastic.

A round or (partially) cylindrical interior 13 which receives functional parts of the valve is formed within the valve housing 10. In particular, members for the electromagnetic actuation of the valve are arranged in the interior 13. This involves an (electric) coil 14 which is arranged on a coil core 15. The latter forms a continuous central opening or a core opening 16 which is preferably formed cylindrically and with smooth walls.

A closure member of the valve, in the present case a valve tappet 17, is mounted displaceably within the core opening 16. Said valve tappet is provided with a guide piece 18 which is mounted in the region of the core opening 16 and is of cylindrical or, as shown, polygonal design in the external contour. The guide piece 18 is displaceable, in particular is movable up and down, for the movements of the valve tappet 17 in the longitudinal direction within the core opening 16.

Outside the region of the core opening 16, the valve tappet 17 is provided with a stem or with a nozzle needle 19 of smaller diameter. The actual closure member is attached to the lower end thereof, said closure member in the present case being a ball 20 which interacts with a valve opening 21 (nozzle opening) at the lower end of the valve housing 10. The valve opening 21 is arranged in the region of a funnel-shaped or conical valve seat 22. The valve housing 10 here forms a valve chamber 23 to which the medium—glue—is supplied via a glue duct 24. In the closed position, the ball 20 bears against the valve seat 22 in a sealing manner.

A closure means for the core opening 16 is provided opposite the valve chamber 23 or the valve opening 21. Said closure means here is a closure head which acts at the same time a magnet holder 25. The latter is designed as a cylindrical or ball-like body which is arranged so as to fit within the core opening 16 in the coil core 15. The closure head or magnet holder 25 is held by a threaded ball 26 in a carrier 28 which is likewise attached by means of a thread to the valve housing 10, namely to an (upper) cover 27. The relative position of the magnet holder 25 is thereby adjustable.

The magnet holder 25 as an opening closure is sealed within the core opening 16, namely by an O ring 29. The latter delimits the magnet holder 25 from a permanent magnet 30 which is arranged within the core opening 16 and in the present case as a cylindrical contour and, together with the (downwardly directed) free surface, serves as a stop for the valve tappet 17 in the open position.

A special characteristic is the design of the coil core 15. The latter consists of a preferably cylindrical, thin-walled supporting piece 31 on which the coils of the core 14 are mounted. Transversely directed boundaries for the coil 14 are arranged at the ends or on end regions of the supporting piece 31. Said boundaries are designed in the present case as boundary disks 32, 33. The circular disks 32, 33 preferably form an (integral) unit with the supporting piece 31. The two boundaries 32, 33 are provided on the free side with an (annular) collar 34, 35 which is arranged in each case in a centered manner in a matching guide formed by the valve housing 10.

The coil core 15 is at least partially composed, but preferably entirely composed, of ceramic material, in particular of oxide ceramic material. Zirconium oxide is particularly advantageous as material for the coil core 15, at least for the supporting piece 31. A particular (surprising) advantage consists in that the inner cylindrical circumferential surface of the coil core 15 or of the core opening 16 can be designed to have a very smooth surface by means of appropriate mechanical machining, and therefore the valve tappet 17 or the guide piece 18 thereof is movable within the coil core 15 in a manner virtually free from wear. A further special characteristic is the connection of the plug unit 11 to the valve housing 10 by means of non-positive and/or positive connecting members, which connection is fixed in the manner of a snap-in connection in the position of the valve housing 10 during the assembly of the valve. The plug unit 11 is constructed in accordance with WO 2010/136096, namely with an electric terminal having a plug 36 exposed on the outside. (Electric) lines 37 which lead to the coil 14 adjoin said plug within the plug housing 12. The plug 36 has a connection piece 38 with an external thread. A fixing screw 39 on the outer side of the plug housing 12 and a corresponding fixing screw 40 within the housing fix the plug 36, with the latter being sealed off.

In order to produce the (mechanical) connection between valve housing 10 and plug unit 11, use is made of connecting members designed as separate workpieces, in the present case in the form of connecting clips 41, 42. A first connecting clip 41 is arranged in a region above the permanent magnet 30 and, owing to the design, acts as an upper closure of the plug housing 12. A further (lower) connecting clip 42 is positioned in the region of the boundary disk 33 assigned to the valve seat 22. The two connecting clips 41, 42 interact with the coil core 15, namely are connected in a positive and non-positive manner to the boundary disks 32 and 33.

Figure 3:
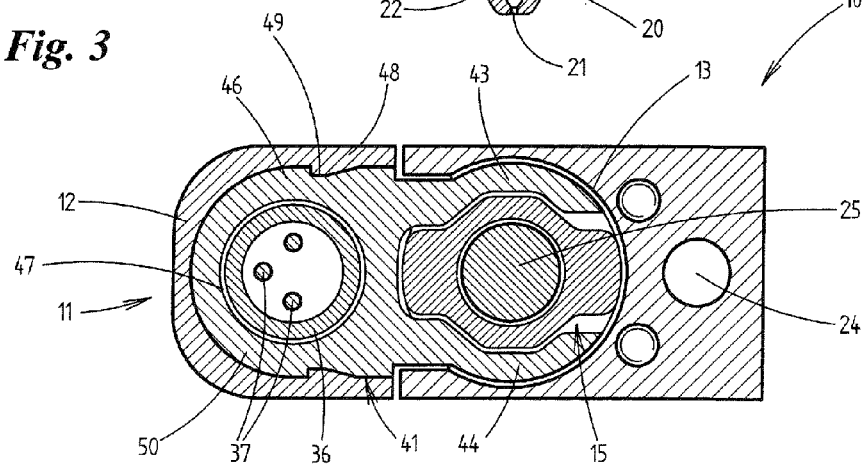
FIG. 3 shows a horizontal section of the glue valve according to FIG. 2 in the section plane III-III.
Figure 4:
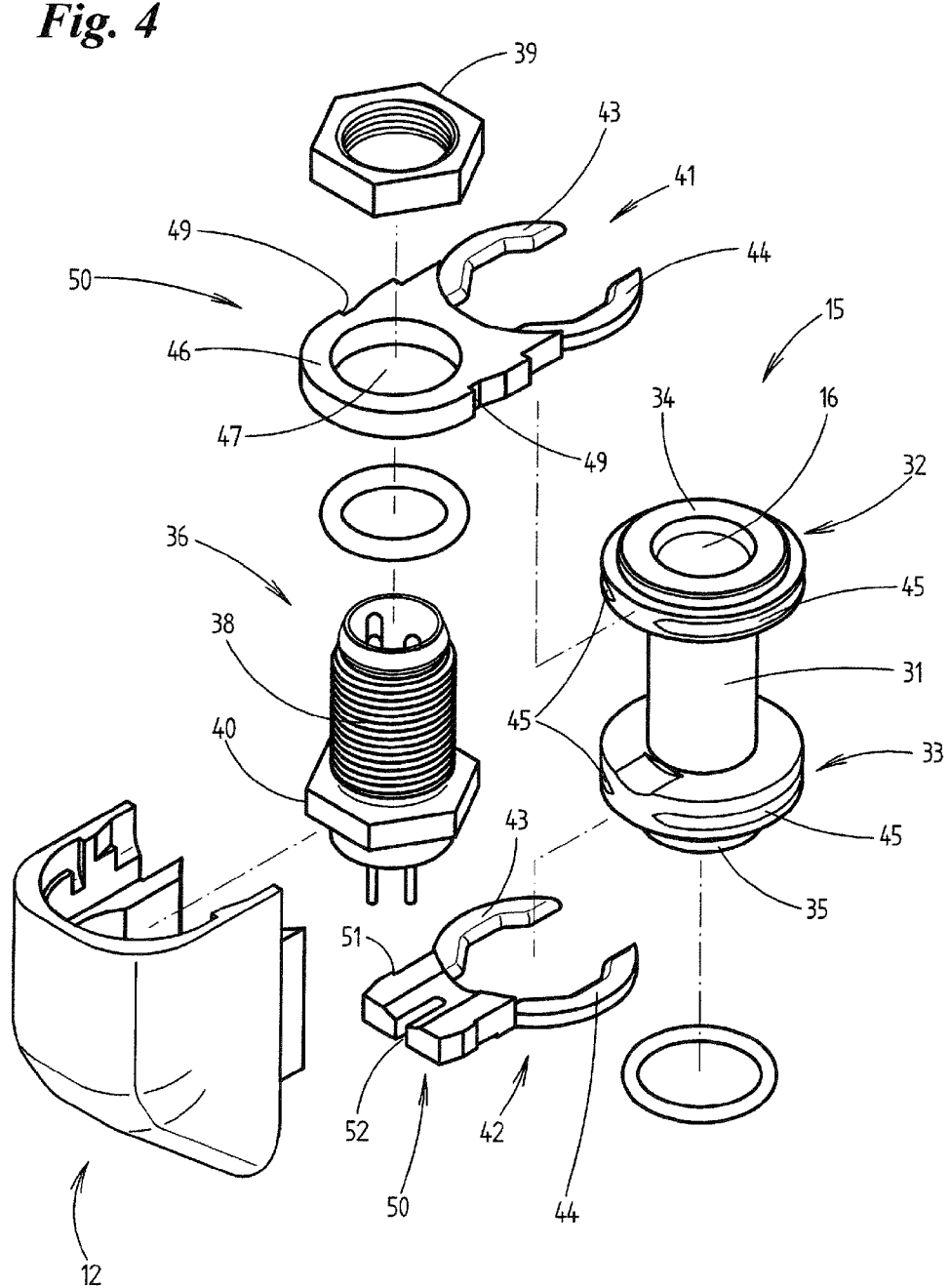
FIG. 4 shows, perspectively, an exploded drawing with individual parts of the valve.

For this purpose, the connecting clips 41, 42 are provided with clamping pieces, in the present case with two clamping fingers 43, 44 which enclose the coil core 15 and the disk 32 or 33 in the connecting position. The outer contour of the clamping fingers 43, 44 is in the shape of an arc of a circle and is dimensioned in such a manner that it ends preferably flush with the boundary disk 32, 33. Said boundary disk is provided with projections and/or depressions on the outer circumference, which ensure a positive engagement of the clamping fingers 43, 44. In the present case, the boundary disks 32, 33 are provided along the circumference with grooves 45 which are each assigned to a clamping finger 43, 44. The grooves 45 are arranged and dimensioned in such a manner that, in the holding position, the clamping fingers 43, 44 preferably end flush on the outside with the boundary disk 32, 33. The clamping fingers 43, 44 are designed on the inside in the present case with a polygonal contour, and, correspondingly, so too are the grooves 45 (FIG. 3). The clamping fingers 43, 44 enclose part of the boundary disks 32, 33, thus producing a positive connection (clip connection) which, owing to the dimensions coordinated with one another, can additionally act in a non-positive manner such that the clamping fingers 43, 44 bear against the boundary disks 32, 33 under tension.

The clamping clips 41, 42 are composed of an elastically deformable material, in particular of a plastic with load-carrying ability. The clamping fingers 43, 44 can be elastically deformed when joined to the coil core 15, namely can be moved apart and pass into the anchoring position in a snap-in operation.

An anchoring piece 46 of the connecting clip 41, 42 is anchored on or in the plug unit 11, specifically preferably also in a positive manner. The (upper) connecting clip 41 assigned to the plug 36 is provided with an opening 47 which is matched to the connection piece 38 and surrounds the latter in a region between the fixing screws 39, 40. The outer contour of the anchoring piece 46 is designed in such a manner that projections and impressions of the plug housing 12 and of the anchoring piece 46 correspond to one another. In the present exemplary embodiment, a projection 48 on the inner side of the plug housing 12 enters into a corresponding depression 49 of the anchoring piece 46 so as to fit therein. This produces a sawtooth-like connection, specifically on both sides of the plug 36.

The connecting clip 42 facing the valve seat 22 has an anchoring piece 50 which is formed in a different manner, likewise with a lateral contour which corresponds in a positive manner to a corresponding contour within the plug housing 12. The anchoring piece 50 is laterally provided with a depression 51 in which a corresponding projection of the housing enters. In order for a non-positive connection or a snap-in connection to be possible, the anchoring piece 50 can be compressed laterally, specifically because of a slot 52 which is open at the free end. The anchoring piece 50 is accordingly a fork-like design.

The connection between valve housing 10 and plug unit 11 is preferably created in such a manner that the clamping clips 41, 42 are inserted in the manner shown into the plug unit 11 assembled in a separate working step, and therefore the clamping clips 41, 42 project with the clamping part thereof—clamping fingers 43, 44—out of the plug housing 12. Said clamping part is pushed in laterally in such a manner that the clamping fingers 43, 44 enclose the boundary disks 43, 44 in the manner of a snap-in connection. The present connection between valve housing 10 and plug unit 11 is not dependent on a specific choice of material for the coil core 15.

A further special characteristic is the control of a glue valve of this or another embodiment. This involves taking the change in the viscosity of the medium and/or the dead weight into consideration. In particular in different working cycles and in particular in the event of a temporary stoppage of the device, including the valves, the viscosity and optionally the dead weight of the medium change. The aim is, when the unit is started up again, to produce identical or identically sized portions of glue in spite of the changed viscosity and to transfer said portions of glue to a carrier.

For this purpose, the (glue) valve has a prolonged (gradually decreasing) opening time during a first phase after the re-start, namely in such a manner that the dispensed amount of glue has the desired size. The change in the viscosity and therefore the change in the size of the (glue) portion is first of all determined with reference to observations and empirical determinations during the continuous, "normal" operation, and the change in the viscosity and therefore the change in the portion size is determined as a function of the duration of the stoppage (and associated cooling of the valve). Corresponding graphs are stored in the control system of the valves—separately for each valve. During the re-start, the procedure takes place with a longer opening period of the valve during an operating phase depending on the stoppage period.

FIG. 5 shows a diagram which schematically shows the algorithm, which is stored in the control system of the glue valve, as an example. The (operating) time tM of the device and therefore of the valve concerned is depicted on the abscissa. The ordinate shows the opening times tv of the valve.

The line $tV_{reg}$ reproduces the opening time of a valve during standard operation. A (linearly rising) line 53 relates to changed opening times of a valve during the re-start after stoppage of a machine ($tM_{stop}$) as a function of the stoppage period. In the specific example, an opening period of tV1 is set at the time tM1 when the valve is restarted.

This example is based on a (preceding) operating interruption ($tV_1$) which is shorter than the maximum acceptable stoppage period $tV_{max}$. After the re-start, the opening period of the valve is returned, corresponding to the chain-dotted, obliquely directed line 54 after a (relatively short) phase of operation with a longer opening period to the standard opening time corresponding to $tV_{reg}$ such that the standard operation is reached at the time $tM_2$. In the event of a longer operating interruption, the time $tV_1$ is determined on the line 53 at a corresponding position. First of all, provision is made in this example for no further increase in the opening period of the valve to be set in the event of a longer operating interruption beyond a period $tV_{max}$.

The dashed line 55 relates to an alternative to the line 53, namely for controlling valves with a lower temperature loss during the stoppage, for example in the case of multiple glue valves. In all cases, the valve is returned after a phase of a longer opening period via phases preferably determined empirically to $tV_{reg}$, as illustrated by the return lines 56, 57 which are assigned to the lines 53 and 55, respectively. The return phases of the opening period can be different from case to case, as expressed by the angle of inclination of the lines 56, 57.

In the event of the separate preassembly of the plug unit 11, the interior of the plug housing 12, in particular in the region of the lines 37, is filled with a conventional filling compound. The latter contributes to additional fixing of the connecting clips 41, 42. Alternatively, the valve can be designed in such a manner that the connecting clips, given an appropriate design, are attached in or to the valve housing 10 and the clamping members 43, 44 on being joined to the plug unit 11 enter into clip-like connections with corresponding holding regions in the plug housing 12.

LIST OF DESIGNATIONS

10 valve housing
11 plug unit
12 plug housing
13 interior
14 coil
15 coil core
16 core opening
17 valve tappet
18 guide piece
19 nozzle needle
20 ball
21 valve opening
22 valve seat
23 valve chamber
24 glue duct
25 magnet holder
26 threaded bolt
27 cover
28 carrier
29 o ring
30 permanent magnet
31 supporting piece
32 boundary disk
33 boundary disk
34 collar
35 collar
36 plug
37 line
38 connection piece
39 fixing screw
40 fixing screw
41 connecting clip
42 connecting clip
43 clamping finger
44 clamping finger
45 groove
46 anchoring piece
47 opening
48 projection
49 depression
50 anchoring piece
51 depression
52 slot
53 line
54 line
55 line
56 return line
57 return line

What is claimed is:

1. A method for actuating a valve for a free-flowing medium, the medium having a changeable viscosity, the valve having an electromagnetically actuable closure member having a closure piece (20) which, in the closed position, bears against a valve seat (22), wherein an opening period of the opening position of the valve is controllable depending on the changeable viscosity of the medium in such a manner that, owing to different opening periods, substantially identically sized portions of the medium are dispensed during the opening period irrespective of the viscosity of the medium, wherein the opening period of the valve is controlled according to a stoppage period of the valve and resultantly induced cooling of the valve and of the medium in such a manner that, in the event of a prolonged stoppage phase during a limited operating period after the valve is restarted, a longer opening period of the valve is set, with the opening period being increasingly reduced as operation continues until a standard opening period is reached.

2. The method as claimed in claim 1, wherein the change in the viscosity of the medium and, depending thereon, the opening period of the valve during the re-start after a stoppage phase is determined on the basis of empirical measurements and an algorithm which is stored in a controller.

3. The method as claimed in claim 1, wherein the change in the viscosity of the medium and, depending thereon, the opening period of the valve during the re-start after a stoppage phase is determined on the basis of empirical measurements and an algorithm which is stored in a controller, by deriving the change in viscosity therefrom with a linear change in the opening period of the valve in accordance with the preceding stoppage period.

4. A method for actuating a valve for a free-flowing medium, the medium having a changeable viscosity, the valve having an electromagnetically actuable valve tappet (17) closure member having a closure piece (20) which, in the closed position, bears against a valve seat (22), wherein an opening period of the opening position of the valve in which the valve tappet (17) of the closure piece (22) is in a position that is raised from the valve seat (22) is changeable depending on the changeable viscosity of the medium in such a manner that, owing to different opening periods, substantially identically sized portions of the medium are dispensed during the opening period irrespective of the viscosity of the medium, wherein the opening period of the valve is controlled according to a stoppage period of the valve and resultantly induced cooling of the valve and of the medium in such a manner that, in the event of a prolonged stoppage phase during a limited operating period after the valve is restarted, a longer opening period of the valve is set, with the opening period being increasingly reduced as operation continues until a standard opening period is reached.

5. The method as claimed in claim 4, further comprising determining the change in the viscosity of the medium and, depending thereon, the opening period of the valve during the re-start after a stoppage phase on the basis of empirical measurements and an algorithm which is stored in a controller.

6. The method as claimed in claim 4, further comprising determining the change in the viscosity of the medium and, depending thereon, the opening period of the valve during the re-start after a stoppage phase on the basis of empirical measurements and an algorithm which is stored in a controller, by deriving the change in viscosity therefrom with a linear change in the opening period of the valve in accordance with the preceding stoppage period.

* * * * *